July 11, 1933.  H. SEBELL  1,918,197
APPARATUS FOR MAKING CAN BODIES
Filed May 21, 1930  2 Sheets-Sheet 1
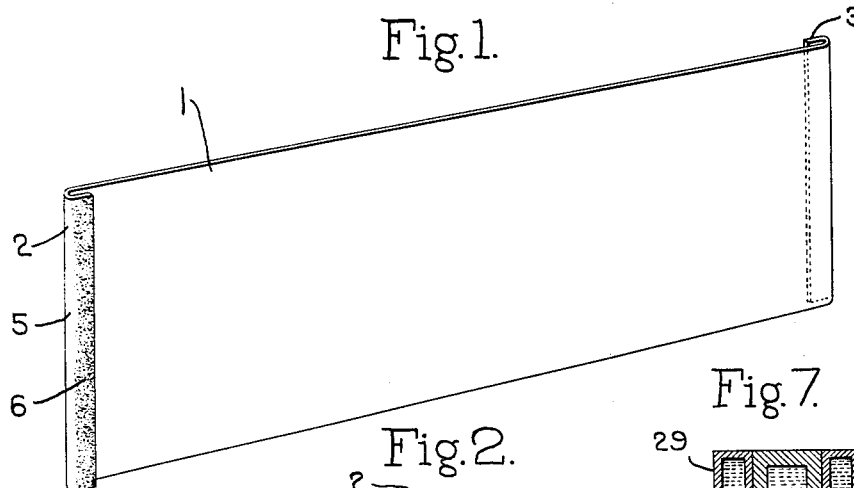
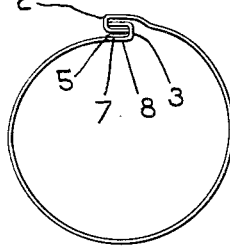
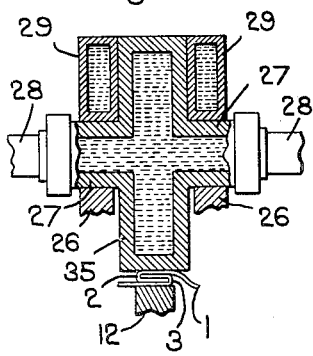
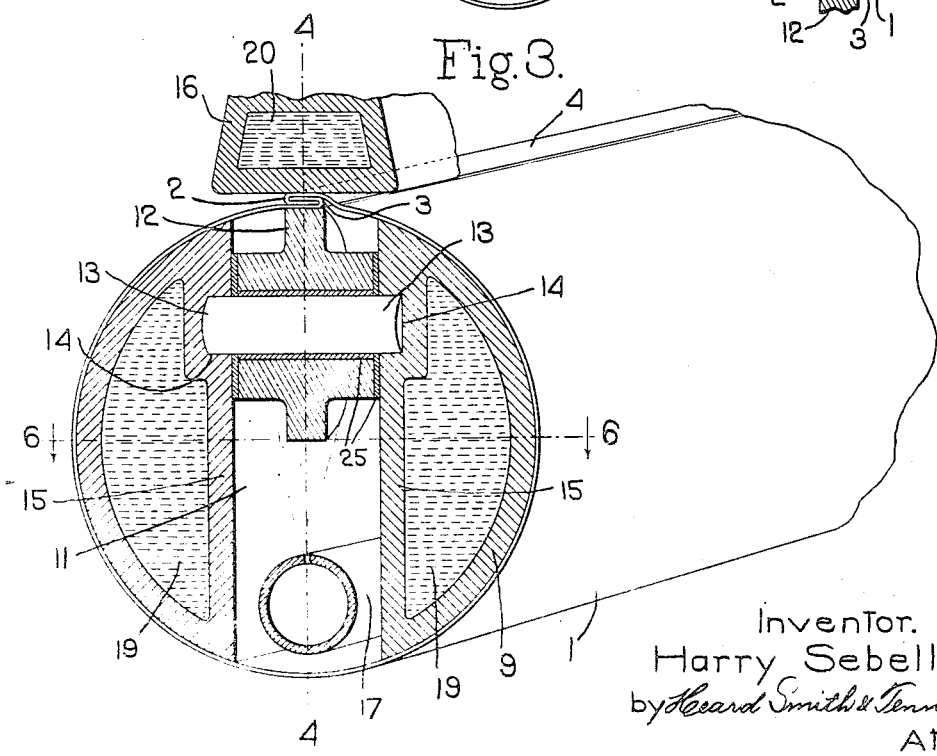
Inventor.
Harry Sebell
by Heard Smith & Tennant.
Attys.

Inventor.
Harry Sebell
by Heard Smith & Tennant.
Attys.

Patented July 11, 1933

1,918,197

UNITED STATES PATENT OFFICE

HARRY SEBELL, OF BOSTON, MASSACHUSETTS, ASSIGNOR OF ONE-HALF TO ARTHUR H. PARKER, OF LEXINGTON, MASSACHUSETTS

APPARATUS FOR MAKING CAN BODIES

Application filed May 21, 1930. Serial No. 454,445.

This invention relates to a device for making can bodies of the type which are formed from a sheet of metal that is bent into cylindrical shape and has its meeting edges soldered together thereby forming a seam which extends from the top to the bottom of the can body.

One of the objects of the invention is to provide a novel device for making a can body of this type by which the heat necessary to effect the soldering operation is applied locally to the seam on the inner face of the can body while the rest of the can body is kept relatively cool.

A machine embodying the invention is of special advantage in forming can bodies which have imprinted thereon some wording or some design. Many cans or tin containers have some wording descriptive of the contents or the directions for use, or some design or trade-mark, etc. imprinted directly on the exterior thereof and frequently the can or container is provided with a protective coating which is applied after the printed impression has been made and which has for its purpose to protect the printed impression.

In the making of cans or containers of this type as heretofore practiced it has been the custom to leave a space either side of the seam on the can body which is free from printed matter and also free from the protective finish. The reason for this is that the manner of soldering the side seam of the can as heretofore practiced is such that it would injuriously affect any printed matter which might be located close to the seam and also any protective coating which was applied over the printed matter.

My invention provides a novel device by which this side seam of the can can be soldered without injuring in any way any printed impression or any finish coating which may be applied to the exterior of the seam itself.

My invention, therefore, makes it possible to form a can body in which the entire surface thereof including the seam is either covered with printed matter or a design or with the protective coating over the same.

In carrying out my invention I employ a soldering machine of the type having a can-supporting member or mandrel adapted to fit the interior of the can and provided with means for heating the portion of the can along the seam sufficiently to melt any solder material or flux which has been applied to the seam, and also having a presser member acting on the exterior of the seam to apply pressure to the seam during the soldering operation. In my present invention, however, the can-supporting member or mandrel not only has means for applying heat to the interior face of the can along the seam to melt the solder material but also is constructed to apply a cooling action to the other portions of the can. Furthermore, the presser member is a cooled member so that it not only applies the requisite pressure to the seam to effect the soldering operation but also applies a cooling action to the exterior face of the seam which is sufficient to keep said exterior face at a temperature below that which would cause injury to any printed matter or protective coating that is applied to the can but insufficient to interfere with the soldering operation.

In order to give an understanding of the invention I have illustrated in the drawings some selected embodiments thereof which will now be described after which the novel features will be pointed out in the appended claims.

Fig. 1 is a perspective view of a blank from which the can body may be made;

Fig. 2 shows the blank bent into the circular form with the can body and with the seam ready to be soldered;

Fig. 3 is a sectional perspective view illustrating the manner in which the seam is soldered with my improved device;

Fig. 7 shows a modified form of the invention.

Figure 4:
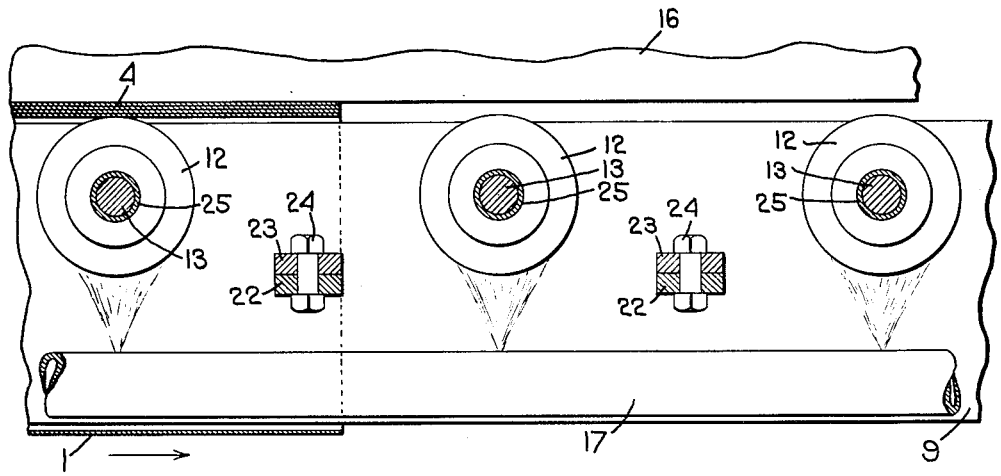
Fig. 4 is a section on the line 4—4, Fig. 3.

In making a can body with a lock seam on the side it is customary first to provide a blank 1 of sheet metal which has its ends bent to form the hook portions 2 and 3. The blank 1 is subsequently bent into circular form and the hook portions 2 and 3 are interengaged for forming the lock seam 4 along the side of the can. Before this is done, however, the outer face 5 of the hook member 2 will be provided with a coating of solder material and some fluxing material, such as a suitable acid, as indicated at 6 so that when the blank is bent into the shape of the can body and the two hook portions 3 and 4 are interlocked the flux- and solder-coated surface 5 of the hook portion 2 engages the face 7 of the hook portion 3. There will thus be one thickness of metal between the solder and flux material 6 and the inner face of the can body but there will be three thicknesses of metal between the flux and solder and the outer face of the can body.

The present invention relates to a novel means for soldering this joint by which the heat for melting the flux and solder material 6 to sweat the joint together is applied locally on the inside of the seam or to the face 8 while the outside of the seam and also the remainder of the can is kept sufficiently cool so that the heat developed for soldering the joint will not injure in any way any printed impression or finish coating which may have been applied to the blank 1 before it is bent into the shape of a can body.

My apparatus comprises a supporting member or mandrel 9 which will preferably be of a size to fit the interior of the can body 10. This supporting member 9 is provided with a soldering member which engages the inner face 8 of the seam and which can be heated sufficiently to melt the solder and flux material 6 thereby to effect the soldering of the seam.

The supporting member 9 is also constructed so that it will have a cooling effect on the remaining portion of the can body and I prefer to also employ means for preventing the exterior face of the seam from becoming sufficiently heated during the soldering operation to affect any printed matter or finish coating which may be applied to the exterior of the can body.

The soldering member may have any desirable shape. As herein shown the supporting member 9 is formed with a longitudinally-extending cavity or recess 11 and the soldering member is in the form of one or more rolls 12 which are journalled in said recess and which come flush with the exterior of the member 9 so that as the can body is moved along the member 9 the rolls 12 will engage the face 8 of the seam.

Each roll is shown as provided with trunnions 13 which are journalled in recesses or bearings 14 formed in the side walls 15 of the cavity 11. The roll or rolls 12 are heated sufficiently so that as the can body is moved along the support 9 the engagement of the hot rolls with the inner face 8 of the seam will fuse the solder and flux material thus producing the soldered joint. At the same time the exterior of the can body along the seam is subjected to a cooling action which will prevent the heat generated by the soldering from injuring any printed matter or lacquer or enamel finish which may have been applied to the outer surface of the can body.

These rolls may be heated by any appropriate means but preferably by means located within the supporting member 9. In the drawings I have shown a burner tube 17 located in the cavity 11 below the rolls and extending longitudinally of the supporting member 9. This burner tube has burner openings situated to direct flame onto the rolls 12. These rolls will thus become sufficiently hot so that they will operate to fuse the solder as the can is moved along the member 9 thereby performing the soldering operation. Where there are a plurality of rolls employed the rolls with which the seam first comes in contact will act as preheating rolls for heating the inner face 8 of the seam and the other rolls will furnish sufficient heat to melt the solder and flux.

The member 9 is constructed so that it will have a cooling effect upon all portions of the interior of the can except along the seam. This may be accomplished by providing the member 9 with chambers 19 through which some cooling medium such as water may be circulated.

As stated above means are provided which not only apply pressure to the outer face of the seam as the soldering is being accomplished but which also apply a cooling action to the outer face of the seam on the exterior of the can in order to prevent the surface of the can along the seam from becoming sufficiently heated to injure any printed impression or finish coating which may have been applied to the exterior of the can. This may be accomplished by means of a cooling presser element which has engagement with the exterior of the seam. In Fig. 3 such a cooling element is shown at 16 and it is provided with a water chamber 20 through which water may be circulated for maintaining it cool. The engagement of this element 16 with the outer face of the seam prevents said face from becoming unduly heated.

In Fig. 7 a different form of cooling presser element is shown. This is in the form of a cooling presser roll 35 which engages the outer face of the seam. The roll is shown as mounted in suitable bearings 26 and is a hollow roll. The hub portions 27 thereof are connected to circulating pipes 28 by a suitable joint which permits the roll to turn freely. A cooling medium may thus be circulated through the roll which will keep it cool. One or more of such rolls may be used and one of them will preferably be placed opposite each of the heating rolls 12. Thus at the time that heat is applied to the inner face 8 of the seam the outer face of said seam will be subjected to a cooling action by the operation of the presser element and said presser element will also function to apply the desired pressure to the seam to make a proper joint.

As an additional means of cooling the roll I may make the bearing 26 with chambers 29 through which water may be circulated and may also make the chambered portion of the bearings of such a shape as to engage the side faces of the rolls.

The supporting member 9 may be supported by any suitable means and the can body may be moved longitudinally thereof in any appropriate way. This supporting member may be formed on the end of a forming member by which the blank is bent into the cylindrical shape of a can body and the hook portions are interlocked. As the can moves longitudinally of the member 9 the soldering operation will be performed as above described.

Owing to the manner in which the solder and flux material is applied there is only one layer of metal between the solder and the soldering member while there are three layers or plies of metal between the solder and exterior of the can. Because of this and because of the cooling action of the cooling member the soldering can be performed without heating the exterior surface of the can at the seam sufficiently to injure any finish coating which may have been applied to the can body.

Figure 5:
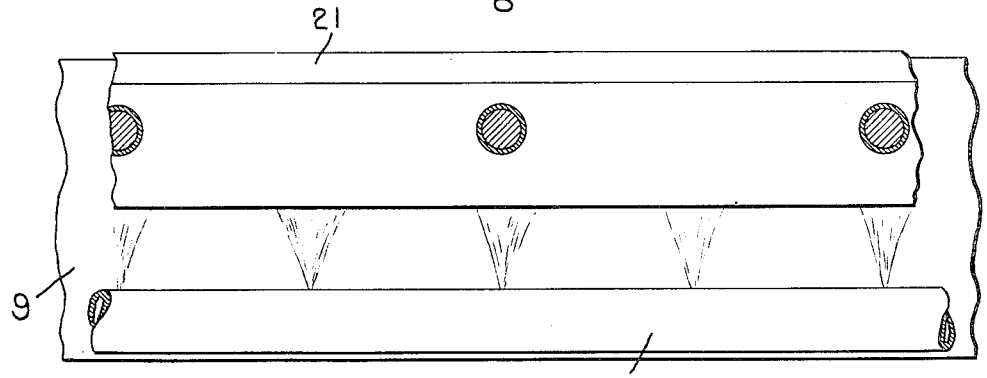
Fig. 5 shows a different embodiment of the invention.
Figure 6:
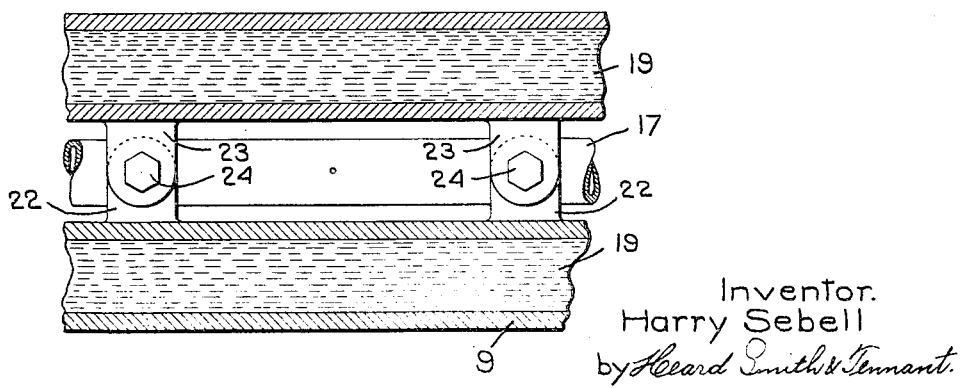
Fig. 6 is a section on the line 6—6, Fig. 3.

Instead of using rolls for the soldering member I may use a blade or non-rotatable soldering element as shown at 21 in Fig. 5. This soldering element is supported in the recess or cavity 12 and is heated by the burner tube 17 as above described.

I have herein shown the supporting member 9 as made in two sections rigidly connected together, each section having a water-circulating chamber 19. One section is shown as having lugs 22 extending from the face 15 thereof and the other section is shown as having lugs 23 extending from its face 15. Said lugs overlap each other and are secured together by bolts 24.

I claim.

1. A device for making can bodies having a lock seam comprising a supporting member of a size to fit the interior of the can body being formed, means to heat the portion of said member with which the seam contacts, thereby to melt the solder material which has been previously applied to the seam, and means operative at the same time to subject the remaining portion of said member to a cooling action.

2. In an apparatus for making can bodies having a lock seam, a supporting member of a size to fit the interior of the can body being formed, said member having a cavity in one side, a soldering member in said cavity adapted to engage the inner face of the seam, means to heat the soldering member, and means for subjecting the remainder of the supporting member to a cooling action.

3. In an apparatus for making can bodies having a lock seam, a supporting member of a size to fit the interior of the can body being formed, said member having a cavity, a soldering member in said cavity arranged to engage the inside of the can body along the seam, means to heat the soldering member thereby to melt the soldering material which has been applied to the seam, said supporting member having water-circulating passages through which water may be circulated to maintain the exterior surface of said supporting member cool.

4. A device for making can bodies having a lock seam and which are formed by bending into circular shape a blank which is provided with hook portions at its ends, one of which hook portions has solder and flux material applied thereto, said device comprising a supporting member of a size to fit the interior of the can body and over which the can body may be moved from one end to the other, means to heat the portion of said member with which the seam contacts thereby to melt the solder and flux material, and a cooled presser member to engage the exterior of the seam thereby to subject the seam to pressure and also to cool the exterior face thereof.

5. A device for making can bodies having a lock seam comprising a supporting member of a size to fit the interior of the body being formed, means to heat the portion of said member with which the inner face of the seam contacts thereby to melt any solder material which has been previously applied to the seam, means operative at the same time to subject the remaining portion of said member to a cooling action and a cooled member engaging the exterior face of the seam.

6. In an apparatus for making can bodies having a lock seam comprising a supporting member of a size to fit the interior of the can body being formed, said member having a longitudinal cavity open at one side thereof, a soldering member in said cavity arranged to engage the inside of the can body along the seam, means within said supporting member to heat the soldering member thereby to melt soldering material which has been applied to the seam, said supporting member having water-circulating passages through which water may be circulated to maintain the exterior surface of said supporting member cool and a cooled member engaging the exterior of the can.

7. A device for making can bodies having a lock seam comprising a supporting member of a size to fit the interior of the can body being formed, means within said member to heat the portion thereof with which the seam contacts thereby to melt the solder material and flux which has been previously applied to the seam, a roller engaging the exterior of the seam and means for cooling the roller.

8. A device for making can bodies having a lock seam comprising a supporting member of a size to fit the interior of the can body being formed and constructed to permit the can body to be applied thereto at one end and to be moved longitudinally thereof and delivered therefrom at the other end, means within said member to heat the portion thereof with which the seam contacts, thereby to melt the solder material and flux which has been previously applied to the seam, and means operative at the same time to subject the remaining portion of said member to a cooling action.

9. A device for making can bodies having a lock seam comprising a supporting member of a size to fit the interior of the can body being formed and constructed to permit the can body to be applied thereto at one end and to be moved longitudinally thereof and delivered therefrom at the other end, means within said member to heat the portion thereof with which the seam contacts, thereby to melt the solder material and flux which has been previously applied to the seam, means operative at the same time to subject the remaining portion of said member to a cooling action, and a cooled member to engage the exterior of the seam.

10. A device for making can bodies having a lock seam comprising a supporting member of a size to fit the interior of the can body being formed, means to heat the portion of said member with which the seam contacts thereby to melt solder material which has been previously applied to the seam, a presser member to engage the exterior of the seam and subject the same to pressure as the solder material is melted, and means for cooling said presser member sufficiently to maintain the exterior surface of the can body at the seam at a temperature below that which would cause injury to a printed impression previously applied to the can body.

In testimony whereof, I have signed my name to this specification.

HARRY SEBELL.